Feb. 11, 1941. W. E. SAXE 2,231,454
ORCHARD PROTECTIVE SYSTEM
Filed Nov. 19, 1937 8 Sheets-Sheet 1

Inventor:
Walter E. Saxe.
Attorney.

Inventor.
Walter E. Saxe.
Attorney.

Feb. 11, 1941.  W. E. SAXE  2,231,454
ORCHARD PROTECTIVE SYSTEM
Filed Nov. 19, 1937  8 Sheets-Sheet 7

Fig. 16.

Inventor.
Walter E. Saxe.
Attorney.

Patented Feb. 11, 1941

2,231,454

UNITED STATES PATENT OFFICE 2,231,454

ORCHARD PROTECTIVE SYSTEM

Walter E. Saxe, Alhambra, Calif.

Application November 19, 1937, Serial No. 175,464

22 Claims. (Cl. 47—2)

This invention pertains generally to orchard protective systems operating to maintain a circulation of air within the orchard atmosphere to prevent damage to the fruit and trees during freezing weather. More specifically, the invention deals with improvements in apparatus for projecting a high velocity air stream radially about the point of projection, into the atmosphere above the plantings to be protected. Systems of this type also comprise the subject matter of United States Letters Patents granted to Edward S. Cobb: No. 1,317,959, issued October 7, 1919, on Frost preventer for orchards; No. 1,357,314, issued November 2, 1920, on Process for preventing frost or heat drying in orchards; No. 1,571,467, issued February 2, 1926, on Temperature regulating device for orchards; and No. 1,639,257 issued August 16, 1927, on Temperature-regulating device for orchards.

The general objects of the present invention are directed to improvements in supporting structures for mounting a wind blower assembly at an elevated position in the orchard, and improvements providing said assembly with capacities for adjustment and regulation in operation whereby the direction and rate of lateral or sweeping travel of the projected air stream may be controlled to give superior performance in general, and to meet special conditions that may exist in particular installations. The invention further aims to provide, in conjunction with the improvements mentioned, means for supplying in a practical and efficient manner, heated gases to the vicinity of the propeller for the purpose of warming the projected air stream.

One of my principal objects is to provide an improved mounting for the motor and propeller assembly comprising a vertically elongated carriage rotatably supported on and extending downwardly about a stationary column. The carriage preferably is vertically supported at the upper end of the column, and is laterally supported on the column at a point located a substantial distance below its upper end, so that in its rotative movement, the carriage has full vertical and lateral stability. A further feature of the invention is the use of a tubular or cylindric carriage rotatable concentrically about a correspondingly shaped column. For the purpose of controlling the direction of the projected air stream I provide a motor and blower supporting structure mounted on the rotatable carriage so as to permit variation of the vertical angularity of the path of the air currents moved by the propeller. Preferably the carriage is rotated by virtue of the propeller thrust, and in this connection the invention provides another important improvement in the use of a governor operating by air resistance to its rotational movement, to control the rotative speed of the carriage.

While numerous objects and aspects of the invention might preliminarily be stated at length, it is believed that all the various features of the invention can last be explained and most readily understood, by proceeding with the following detailed description of the invention as exemplified in certain typical and illustrative forms. Throughout the description reference is had to the accompanying drawings, in which.

Referring first to the form of the invention shown in Figs. 1 to 9, the apparatus may be described generally as comprising a vertical supporting column 20, a vertically elongated carriage 21 mounted on and rotatable about the column 20, and a motor, propeller and wind director assembly 22 mounted on the carriage 21 so as to be vertically and tiltably adjustable relative thereto. In its preferred form, the supporting column 20 comprises a cylindric tube 23 supported on a concrete foundation 24, the column resting on a base plate 25 that is anchored to the foundation by bolts 26 extending through radial feet 27. The latter are welded to a sleeve 28, which in turn is welded at 29 to the tubular column. However, while as stated the vertical supporting means 20 is preferably of tubular or cylindric form, that particular formation having certain definite advantages and forming a part of the invention in certain of its aspects, as will hereinafter appear, yet in other aspects of the invention, and with certain structural modifications in view, the column need not of necessity be of cylindrical form, and for the purpose of the claims the expression "column" is to be understood as not implying or denoting a supporting structure of cylindrical form except where so specified, but as contemplating any suitable vertical supporting means for the members mounted thereon. The carriage 21 is vertically supported and mounted for rotation on the upper end of the column 23, see Fig. 2, the carriage being directly supported by a table 30 which in turn is supported on the top closure 31 of the column. The table is connected to plate 31 by bolts 32 extending through spacers 33, and the table load is taken by a supporting channel 34 extending transversely within the column 23 and welded at its ends thereto.

Figures 1, 2, 3, 4:
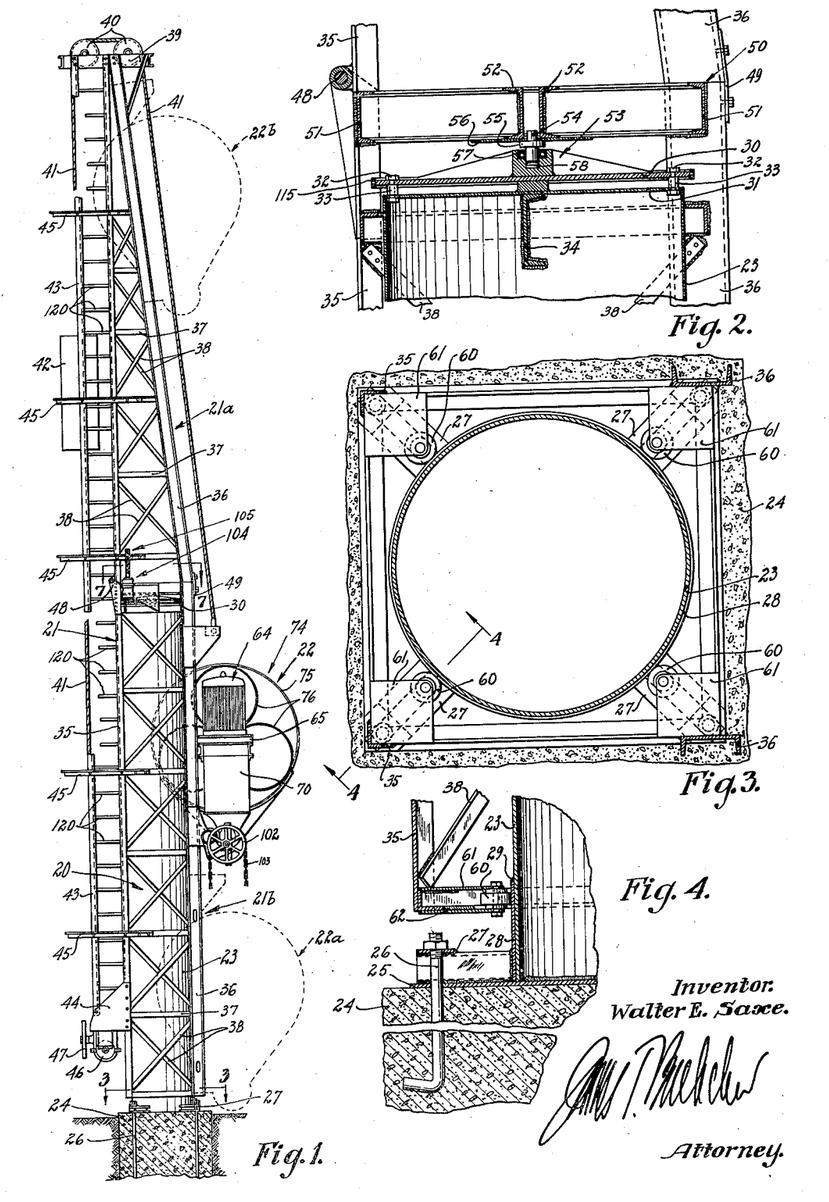
Fig. 1 is an elevation showing one form of the invention.
Fig. 2 is an enlarged fragmentary section showing the carriage mounting on the upper end of the supporting column.
Fig. 3 is an enlarged cross section taken on line 3—3 of Fig. 1.
Fig. 4 is a section on line 4—4 of Fig. 3.

In the form of the invention shown in Fig. 1, the carriage 21 comprises an open frame structure including upper and lower sections 21a and 21b, each having a pair of vertically extending angle irons 35, channel members 36, and horizontal and diagonal braces 37 and 38. A crown block 39 at the top of the carriage provides a mounting for sheaves 40 over which passes a cable 41 attached at one end to the assembly 22, and at its opposite end to a weight 42 which is sufficiently heavy to counterbalance, to a substantial extent, the weight of the motor, propeller and wind director assembly. The counterweight 42 is guided between a pair of rails 43, extending from the crown block 39 to a pair of brackets 44 mounted on the angle frame members 35 near the base of the column guide rails 43, and supported at vertically spaced intervals by brackets 45. The assembly 22 is vertically movable on the carriage to adjusted position, by a suitable cable winding and releasing means, for example a winding reel 46 mounted on brackets 44 and operated by hand wheel 47. To facilitate transporting, handling and erecting the main prefabricated carriage frame structure, the latter is conveniently made in sections 21a and 21b connected by a hinge 48, so that before the frame structure is completed by the addition of guide members 43 and brackets 45, the two sections 21a and 21b may be collapsed by movement about the hinge. As shown in Fig. 2, the abutting ends, opposite the hinge 48, of the upper and lower carriage sections may be held together by a suitable connection, typified by plates 49 overlapping the joint 50, and attached to the channel members 36.

At the upper end of lower carrier section 21b, the vertically extending members 35 and 36 are interconnected by horizontally extending members 51. Extending between one pair of the members 51 and welded thereto is a pair of channels 52 supported on the table 30 by a bearing structure, generally indicated at 53, including a pin shaft 54 having a flange 55 supporting plate 56 upon which channel members 52 rest. Shaft 54 is journaled within bearings 57 and is supported at its lower end on a noduled or button-shaped bearing 58 which permits rotation of the shaft and carriage assembly with minimum friction.

The carriage is laterally supported against the column 20 preferably at a substantial distance below the bearing 53, by a plurality of rollers 60 (see Fig. 4) mounted on the lower end of the carriage between bracket plates 61 and 62, in such positions as to engage and rotate about sleeve 28 applied to the bottom of the column. With the carriage thus vertically supported and freely rotatable on the single point bearing 58, and with the carriage laterally supported against the column by rollers 60 riding freely on the surface of sleeve 28, the carriage is given full vertical and lateral stability with minimum frictional resistance to its rotation. It will be understood of course that shaft 54 and bearing 58 will be made of hard metal capable of supporting the load imposed on the single point mounting.

Figure 5:
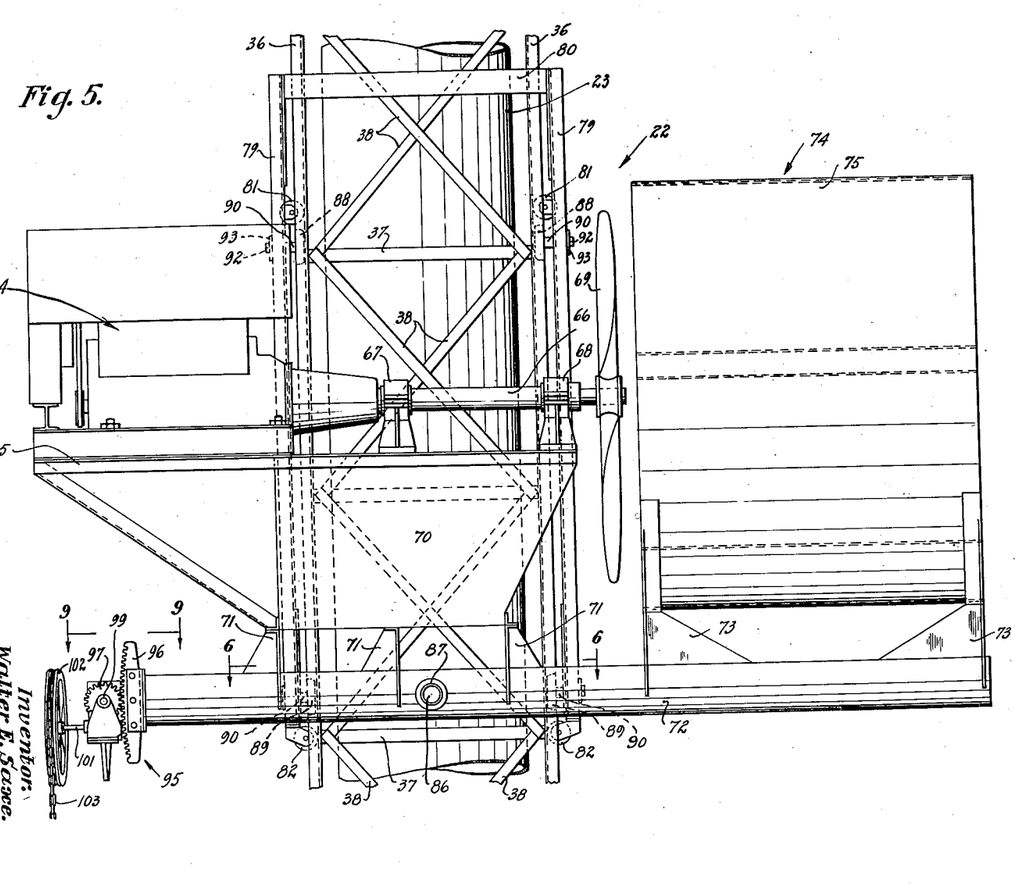
Fig. 5 is an enlarged side elevation showing the motor, propeller and wind director assembly and its mounting on the carriage.

Referring now to Fig. 5, assembly 22 comprises a suitable motor, preferably an internal combustion engine 64, mounted on a platform 65. The engine driven shaft 66, journaled in bearings 67 and 68 supported on the platform 65, carries the propeller 69 which operates to project a high velocity air stream outwardly into the orchard and above the plantings to be protected. Platform 65 conveniently may be supported on a tank 70 containing fuel for the engine 64. Tank 70 in turn is mounted on brackets 71 welded (see Fig. 6) to a horizontally extending supporting member 72 which, for structural reasons, may advantageously consist of a pipe. Supported on the outer portion of pipe 72, as by means of welded plates 73 similar to supports 71, is a wind director 74 which may be of any suitable shape and construction capable of receiving and confining the air stream projected by the propeller 69, so that the air thence is directed into the orchard atmosphere in a straight flowing, high velocity stream. As illustrated in Fig. 1, wind director 74 typically may consist of an outer cylindric shell 75 containing a group of smaller diameter and correspondingly shaped shells 76. At this point it is observed, referring to Fig. 5, that the entire assembly including the motor 64, propeller 69, fuel tank 70 and wind director 74, is mounted on the tubular supporting member 72. As will now appear, tube 72 and its supported assembly, are mounted on the carriage 21 for vertical and tilting movement relative thereto.

Figure 6:
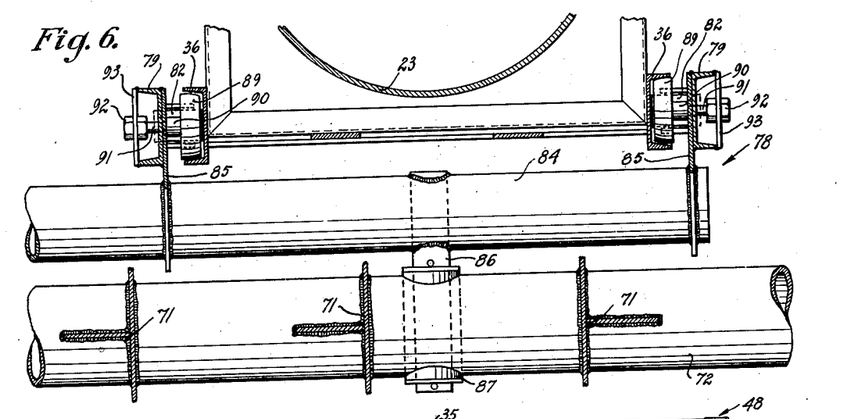
Fig. 6 is an enlarged fragmentary section on line 6—6 of Fig. 5.

As best illustrated in Fig. 6, pipe 72 is pivotally mounted on a supporting frame structure, generally indicated at 78, comprising a pair of vertically extending channel members 79 interconnected at their upper ends by a transverse member 80, see Fig. 5, and carrying rollers 81 and 82 which travel within the channels of the vertically extending carriage members 36. Members 79 and 80 thus are included in a frame structure movable vertically on the carriage 21. A tubular supporting member 84 extending horizontally and, normally, substantially parallel with tube 72, is supported on channel members 79 of the vertically movable frame, by means of brackets 85 welded to the pipe and to the inner surfaces of the channel members. Projecting horizontally from tube 84 in axial alinement with the radial center of supporting column 23, is a trunnion 86 on which pipe 72 is mounted for tilting adjustment, the trunnion being journaled within a tubular bearing 87 extending transversely through pipe 72. Channel members 79 also carry vertically spaced pairs of rollers 88 and 89 received within the carriage channel members 36 and guiding the vertically movable frame in a plane at right angles with the previously described rollers 81 and 82. Rollers 88 and 89 are journaled on shafts 90 having extensions 91 bolted at 92 to plates 93 applied to channel 79.

Figures 8, 9:
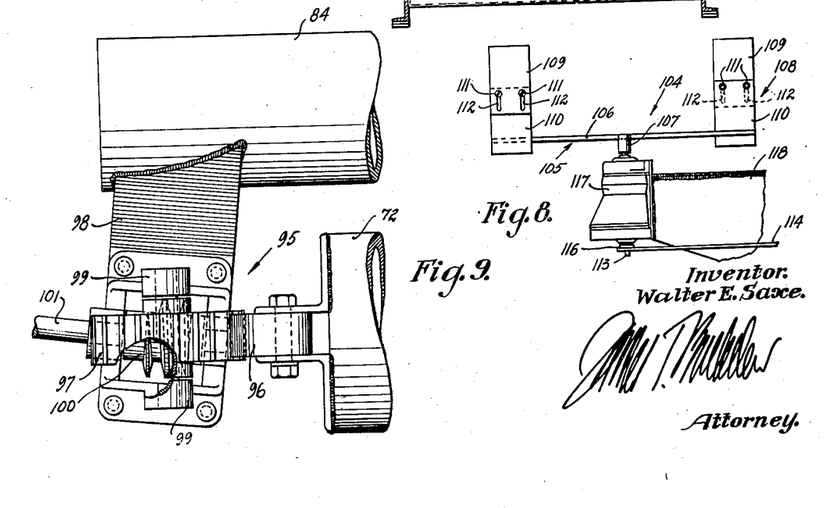
Fig. 8 is a side elevation of the governor as viewed from line 8—8 of Fig. 7.
Fig. 9 is a fragmentary enlarged plan as viewed from line 9—9 of Fig. 5.

Tube 72 and the parts supported thereon are tiltably adjustable about trunnion 86 by suitable mechanism of the type shown at 95 in Fig. 9, which may be operated from the ground surface while the assembly 22 is raised to an elevated position on the carriage. The mechanism 95 comprises an arcuate toothed rack 96 (see also Fig. 5) mounted on the end of the tube 72, and a spur gear meshing with the rack 96 and mounted on a bracket 98 attached to tube 84. Gear 97 has an axle journaled in bearings 99, and is meshed with a worm gear 100 supported on bracket 98 below gear 97 and driven by a shaft 101 which carries a chain pulley wheel 102. By operating chain 103 trained about wheel 102, gears 97 and 100 may be rotated to move rack 96 and tube 72 and the assembly supported thereby, in either direction about trunnion 86. The purpose and effect of tiltably adjusting the motor, propeller and wind director assembly is of course to vary the angle of the projected air stream with respect to the vertical. Elevation of the rack end of tube 72 tilts the wind director so that the air stream is discharged downwardly into the orchard, the propeller at the same time acting to draw to itself air from a higher elevation in the atmosphere, which is desirable at times because of higher temperatures in the upper atmosphere, and the advantage gained by circulating air in a generally downward course from the upper warmer to the lower cooler atmosphere within the orchard. It may also be mentioned that where the orchard is planted on unlevel ground, the assembly 22 may be adjusted and maintained at a tilted position that will most effectively produce air circulation over the orchard in conformity with its contour.

With the assembly 22 mounted in offset position with relation to the axis of rotation of the carriage 21, as best illustrated in Fig. 1, the propeller thrust acts to rotate the carriage and its supported parts about the column 20. It is desirable that the rotative speed of the carriage be capable of control in order to preclude the possibility of the engine and propeller assembly running away at excessive speeds, and to maintain the proper rate of sweeping travel of the projected air stream to insure that the air will be moved outwardly to the more distant parts of the orchard. For this purpose I provide a governor device, generally indicated at 104 which, in its preferred form, is unique by virtue of its operating by self-imposed air resistance to maintain the carriage at a predetermined rotative speed. Being an air governor type, the device 104 has the further advantages of extreme simplicity in construction, operation and reliability of performance.

Figure 7:
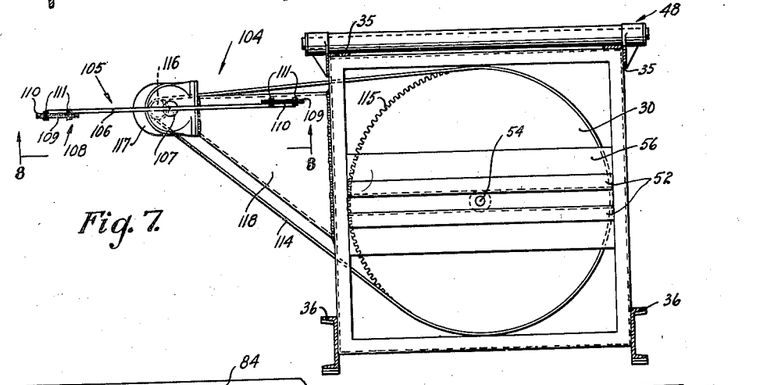
Fig. 7 is an enlarged cross section on line 7—7 of Fig. 1.

Referring particularly to Figs. 7 and 8, the governor 104 comprises a rotating element 105 which when driven by the carriage through a suitable speed increasing gear connection, creates an increasing air resistance as its speed of rotation increases, until a predetermined resistance is established to limit the rotative speed of the carriage. It will be understood that the vane element 105 may be of any suitable type and construction capable of performing the named functions, and that is also capable of adjustment to vary the wind resistance to its rotation at given speed. Typically, the vane 105 is shown to comprise a horizontally extending member 106 mounted on a shaft 107 and carrying vane elements 108 spaced equidistant from the shaft and comprising, each, a pair of vertically overlapping plates 109 and 110. Plates 109 are vertically adjustable with relation to plates 110, to vary the effective area of the vanes, by means of screws 111 threaded into plates 110 and extending through slots 112 in plates 109.

Shaft 107 is driven by a lower shaft 113 which, in turn, is driven by the carriage 21 by way of chain 114 extending about a stationary ring gear 115 on the periphery of table 30, see Fig. 2, and sprocket 116 carried on the shaft. Shaft 113 drive shaft 107 and the chain assembly through a gear box 117 mounted on an arm 118 supported by the carriage. The gear ratio of the transmission within box 117 causes shaft 107 to rotate at a sufficiently high speed to rotate the vane at a velocity that will create an air resistance sufficient to maintain the rate of carriage rotation at a predetermined maximum. By virtue of the adjustability of the vane, the resistance created by it, and consequently the rate at which the carriage rotates, may be varied as desired.

The operation of the apparatus will be apparent from the foregoing. Initially, the assembly 22 may, by operation of hand wheel 47, be elevated from a position of accessibility near the ground surface, as indicated by the dotted lines 22a, to an elevated operating position that may be at any location between the extreme lower and upper positions indicated at 22a and 22b. As explained, when the engine is started into operation, the propeller projects a high velocity stream of air through the wind director 74 and outwardly above the plantings to be protected and also at a desired angle with respect to the vertical, as may be determined by tilting adjustment of the assembly 22 by operation of chain 103. The projected air stream sweeps laterally over the orchard as the carriage 21 and the assembly 22 rotate about the column 20 through complete 360°, at a rate sufficiently slow to insure proper air movement, as determined by the adjustment of governor 104. Finally it may be observed that all parts of the apparatus may be made readily accessible from the ground surface by placing on one of the counterweight guide members 43 and the adjacent corner member 45 of the carriage, steps 120 forming a ladder that rotates as part of the carriage and extends to its uppermost height.

Figures 10, 11:
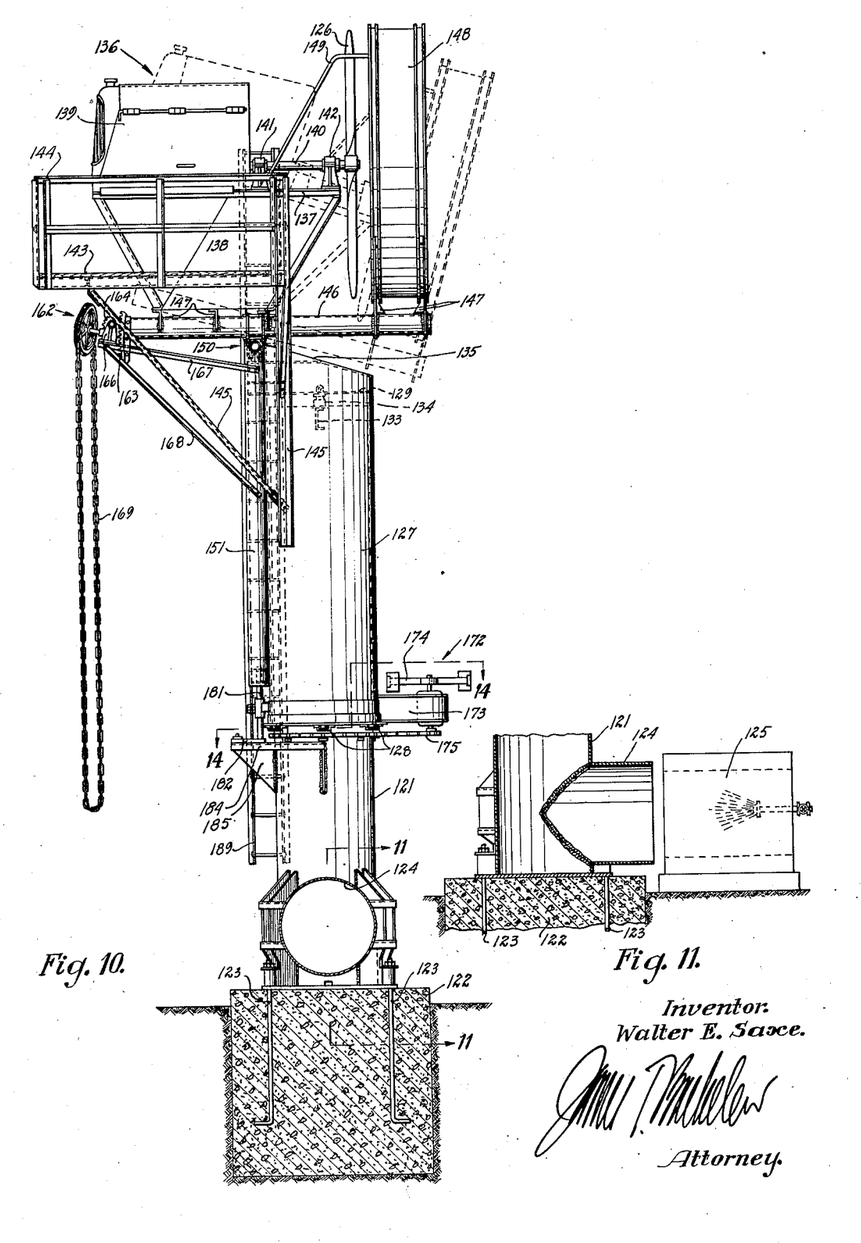
Fig. 10 is a side elevation showing a variational form of the invention.
Fig. 11 is a vertical section taken on line 11—11 of Fig. 10.
Figure 12:
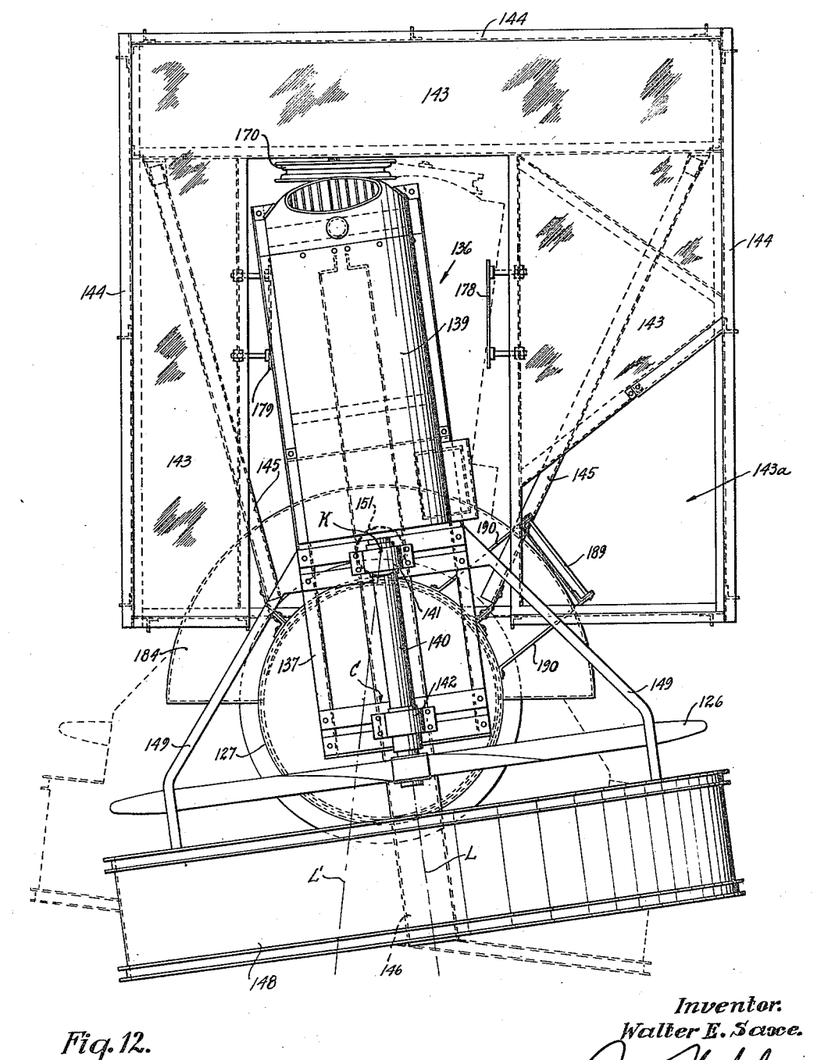
Fig. 12 is an enlarged plan view of Fig. 10.
Figures 13, 15:
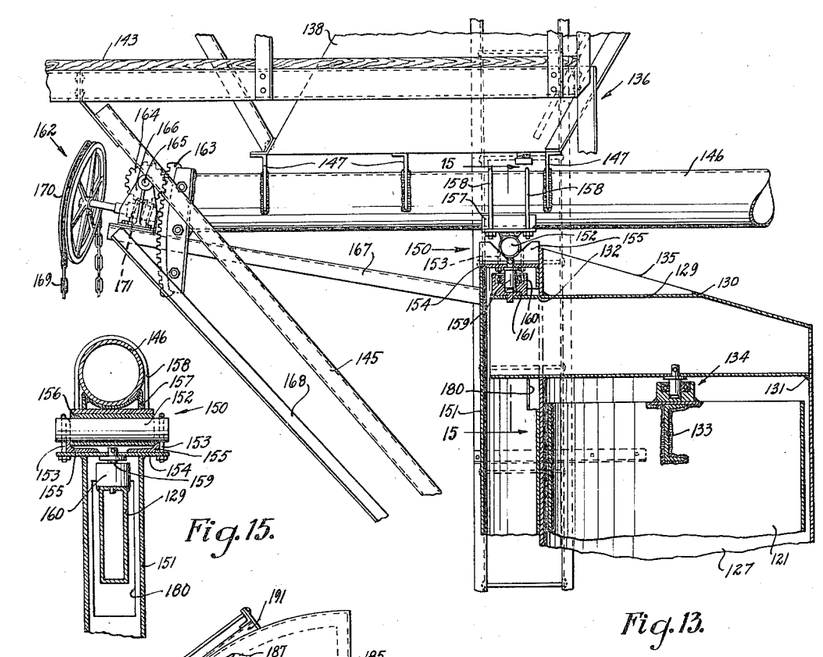
Fig. 13 is a fragmentary view, partly in section, showing certain parts of the propeller and wind director supporting assembly illustrated in Fig. 10.
Fig. 15 is a fragmentary vertical section on line 15—15 of Fig. 13.
Figure 14:
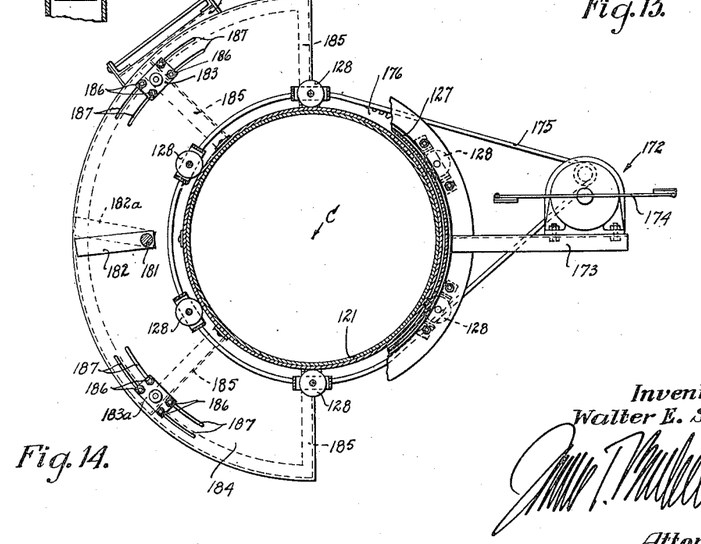
Fig. 14 is an enlarged cross section on line 14—14 of Fig. 10.

Figs. 10 to 14 illustrate a variational form of the invention similar generally in its construction and operation to the first described form, but differing mainly with respect to the structure and movement of the carriage, the relative positions at which associated parts are mounted on the carriage, and in the provision of means for supplying heated gases to the propeller through the column and carriage assembly. The tubular supporting column 121, anchored to concrete foundation 122 by bolt 123, has near its lower end a laterally extending inlet 124 through which combustion gases from the conventionally illustrated burner 125 passes upwardly through the column to the suction side of the propeller 126, to warm the projected air stream. The carriage comprises a cylindric tube or sleeve 127 placed about the column 121 and mounted thereon for oscillatory rotational movement, as will presently appear. As best illustrated in Figs. 10 and 14, tube 127 carries at its lower end a series of rollers 128 bearing against the surface of the supporting column. A horizontal hollow beam 129, see Figs. 13 and 15, welded at 130 and 131 to the tubular carriage at its upper end and extending diametrically through an opening 132 in the wall thereof, is supported on a transverse beam 133 terminally welded to the column 121. The carriage is supported for rotation about the column on a bearing assembly 134 of the type previously described with reference to Fig. 2. The upper end of the carriage is inclined along surface 135 to enable tilting adjustment of the motor, propeller and wind director assembly 136.

The assembly 136 includes a platform 137 mounted on the fuel tank 138 and supporting the motor 139, shaft 140, bearings 141, 142, and propeller 126. A walkaway 143 having a railing 144 extending below and along three sides of the platform 137, is supported by suitable braces 145 on the carriage 127 so as to rotate therewith, together with the assembly 136. Tank 138 and its supported parts are mounted on a horizontally extending tube 146 by means of brackets 147. Tube 146 supports the wind director 148 to which are attached braces 149 running to the platform 137. Tube 146, the wind director 148 and the assembly 136 are tiltable as indicated by the dotted lines in Fig. 10, on a mounting, generally indicated at 150, carried by a vertically extending tube 151. The mounting 150 comprises a trunnion 152 secured by strap bolts 153 to a plate 154 on the upper end of tube 151, the trunnion being supported on a pair of angle brackets 155. The trunnion extends through a bearing sleeve 156 welded to a saddle 157 bearing against the bottom of pipe 146 and secured thereto by strap bolts 158. As shown in Fig. 13, the mounting 150 and its supported parts are supported on the outer end of beam 129 for rotation relative to the carriage, by a bearing assembly similar to that illustrated in Fig. 2, and comprising a pin shaft 159 supporting plate 154 and tube 151 and journaled within bearing 160. The lower end of shaft 159 is supported on bearing 161 of the form shown at 56 in Fig. 2. From the foregoing it will be understood that the assembly 136 is tiltable about trunnion 152, and that the assembly, together with tube 151, are rotatable with relation to the carriage tube 127, on the bearing carried by beam 129.

The mechanism generally indicated at 162, for adjustably tilting the assembly 136, may be similar to the corresponding mechanism in the first described form. Rack 163 carried on the end of tube 146 meshes with a gear 164 carried on shaft 165 journaled in bearings 166, the latter being supported on braces 167 and 168 attached to pipe 151, as shown in Fig. 10. By manipulation of chain 169 trained over wheel 170, rack 163 may be actuated through worm gear 171 and spur gear 164 to tilt tube 146 and its supported parts.

The rotative speed of the carriage is controlled by a governor 172 of the previously described type, mounted on a bracket 173 attached to the carriage tube. The rotating governor vane 174 is operated by a chain 175 placed about a stationary ring gear 176 carried on the column 121 directly below the lower end of the carriage.

As illustrated best in Fig. 12, all the carriage supported parts including the pipe 151, walkway 143 and the parts supported on the horizontally extending pipe 146, are rotatable about the axial center C of the supporting column. Pipe 146 and its supported parts, together with pipe 151, are rotatable with reference to the carriage 127 and walkway 143, within the limits imposed by stops 178 and 179 mounted on the frame structure of the walkway and engageable by the sides of the fuel tank 138. Referring back to Figs. 13 and 15, it will be noted that pipe 151 is slotted at 180 to permit rotation of the pipe and its supported parts relative to the carrier tube 127 within the limits permitted by stops 178 and 179.

Normally, the axial center line L of the propeller shaft lies at one side or the other of the center C about which the carriage rotates, with the result that the propeller thrust operates to rotate the entire carriage supported assembly in a direction depending upon the side of the rotation center C at which the center line L lies. In the position of Fig. 12, the propeller is operating to rotate the carriage supported assembly in a counter-clockwise direction. The apparatus operates automatically to swing the assembly supported by pipe 146 in an oscillatory movement of predetermined arcuate range about point C as the center, and to shift the center line L about the center K from one side to the other of the center C, as the limits of oscillatory travel about center C are reached. Referring to Fig. 10, a rod 181 integral with and depending from the lower end of pipe 151 carries an arm 182 engageable with stops 183 and 183a, see Fig. 14, placed on an arcuate table 184 supported by brackets 185 on the column 121. Stops 183 and 183a determine the limits of oscillatory rotation of the carriage and its supported parts about column 121 and the center C, and these limits may be varied through adjustment of the stops by means of bolts 186 extending through arcuate slots 187 in the table 184.

Assuming the parts to be in the positions shown in Fig. 12, rotation of the entire carriage supported assembly in a counter-clockwise direction brings arm 182 into engagement with stop 183a. By virtue of its inertia, however, the carriage supported assembly continues to rotate, with the result that pipe 151 is caused by engagement of arm 182 with the stop, to turn, swinging pipe 146 and its supported parts to a center line position at the opposite side of center C, as represented by line L'. During these movements, the rate of rotation of the carriage slows down by virtue of the shift of the propeller axis from one side to the other of the center of rotation, so that the impact against stops 178 is slight. Upon reversal of the position of center line L with relation to center C, arm 182 assumes the dotted line position 182a, and the carriage supported assembly reverses its rotation until the arm 182 comes into engagement with stop 183, whereupon the engine, propeller and wind director assembly is again caused to turn about the center K by virtue of the carriage inertia, in a sequence of operations the reverse of that previously explained. As will be understood, throughout the oscillatory travel of the carriage, its maximum speed of rotation is under control of the governor 172.

As in the first described form of the invention, access may be had to all the elevated parts of the apparatus by way of ladder 189 mounted on the carriage and rotatable therewith. In Fig. 12, the upper end of the ladder is shown to extend upwardly through an opening 143a in the walkway and to be connected by brackets 190 to the tubular carriage 127. The lower portion of the ladder may carry a member 191 bearing against and slidable along the periphery of the stationary table 184.

It should be mentioned that the automatic reversing mechanism may not necessarily be used, except in situations where it is desired to limit the sweeping travel of the air stream being projected by the apparatus, within an area less than full 360° about the point of projection, as may be the case where the apparatus is positioned at one side of, rather than in the center of the orchard area to be protected. Should it be desired to permit the carriage to have continued full 360° rotation, it is only necessary to remove stops 183, 183a so that the assembly 136 will remain in constant relationship to the center of rotation C, and will continue to revolve completely about that center.

Figure 16:
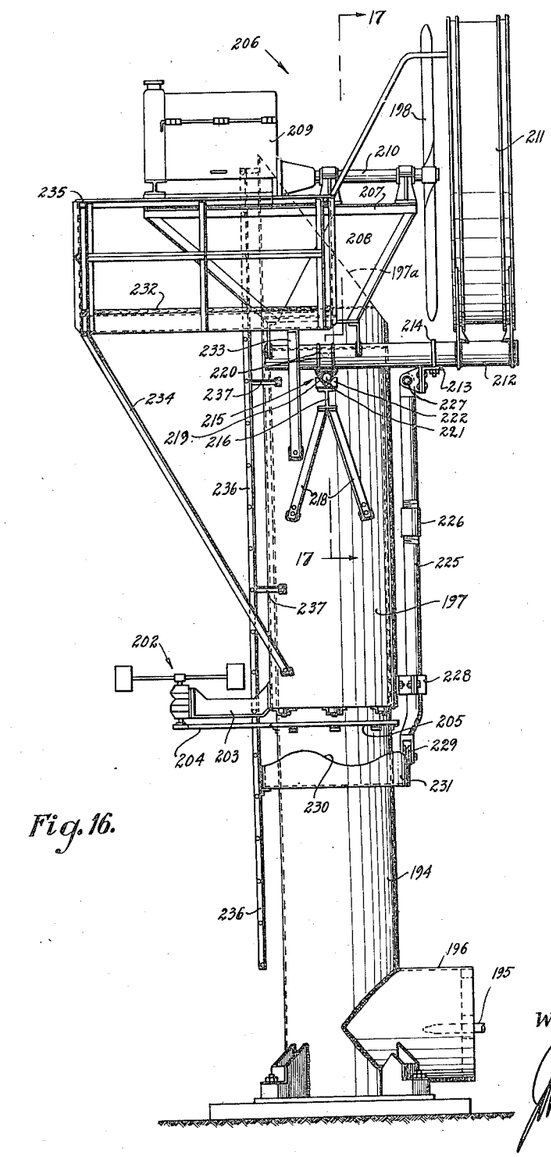
Fig. 16 is an elevation similar to Fig. 10, showing an additional variant form of the invention.
Figure 17:
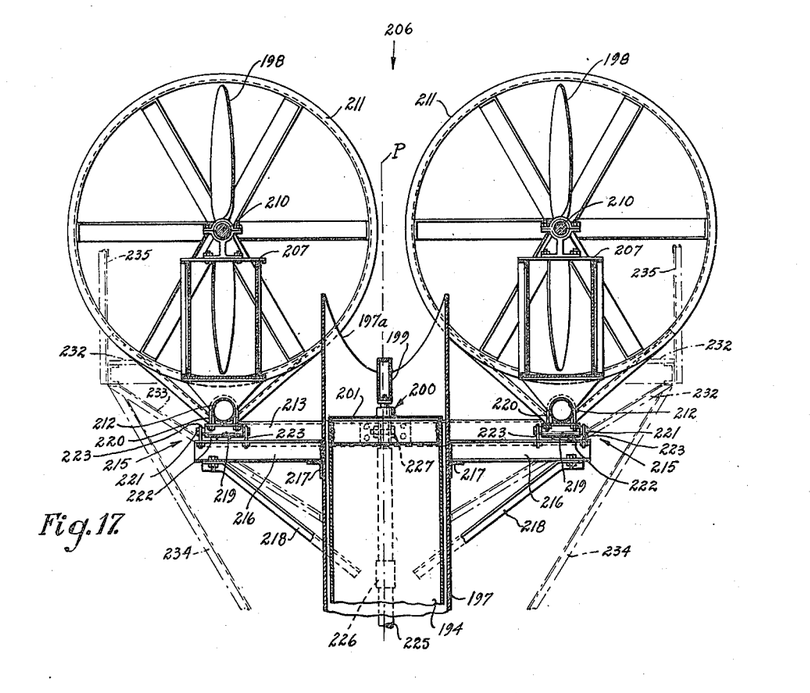
Fig. 17 is a sectional view taken on line 17—17 of Fig. 16.

The second variational form of the invention shown in Figs. 16 and 17 differs from the first described forms principally in the provision of means for automatically tilting the engine, propeller, and wind director assembly in predetermined intervals during rotation, and in the mounting of two such assemblies on the rotating carriage. The hollow tubular column 194 receives hot combustion gases from a burner 195 within inlet 196, for delivery upwardly through the column and carriage tube 197 to the propellers 198. The upper end 197a of the carriage terminates at an angle as illustrated, so as to direct the combustion gases toward the low pressure zones back of the propellers. The carriage is mounted for rotation about the column by means of a beam 199 welded to tube 197 and supported on a bearing 200 of the type previously described with reference to Fig. 2. Bearing 200 is supported on the transverse column member 201. As in the previously described forms, the rotative speed of the carriage is controlled by governor 202 mounted by bracket 203 on the carriage and connected by chain 204 with the stationary ring gear 205.

Mounted at opposite sides of the carriage 197 is a pair of motor, propeller and wind director assemblies 206, one only appearing in side elevation, each comprising a platform 207 placed on the fuel tank 208 and supporting the motor 209, propeller shaft 210 and the propeller 198. Each assembly 206, including its wind director 211, is mounted on one of a pair of tubes 212 interconnected by a transverse member 213 fastened to the tubes by strap bolts 214. Each tube 212 is pivotally mounted at 215 on a horizontally extending member 216 supported on the carriage tube by angle iron 217 and braces 218. Each of the mountings at 215 comprises a bearing sleeve 219 secured to the tube 212 by bolts 220, and a shaft 221 supported on notched members 222 and secured to member 216 by bolts 223. The two assemblies 206 together with the interconnected tubular supporting members 212, thus are mounted for tilting movements on shafts 221.

As shown in Fig. 17, the propellers 198 are differentially offset from the plane, represented by line P, running parallel with the propeller axis and through the center of rotation of the carriage. By thus offsetting one propeller a greater distance than the offset of the other, the dual assemblies 206 together with a carriage 197, are caused to rotate at a speed controlled by the governor 202. Provision is made for automatically tilting tube 212 and the parts supported thereby, at predetermined angular intervals in the rotative travel of the carriage about the supporting column. In many situations it may be desirable, for example to obtain most effective results in an orchard planted on hilly ground, to vary the vertical angularity of the projected air stream in accordance with the contour of the orchard, so as to maintain an average uniformity in the elevation above the plantings of the air streams issuing from the propellers. The automatic tilting mechanism comprises a push rod 225 whose length is adjustable by a coupling 226, pivotally connected at 227 to the cross member 213 which interconnects the tubes 212. Rod 225 extends through a guide 228 mounted on the carriage 197, and carries on its lower end a follower in the form of a roller 229 which rides around the surface 230 of a cam 231 mounted on the column 194. As will be understood, the cam surface 230 will be shaped in any given installation in conformity with the contour of the orchard area to be protected, so that as the carriage rotates, tubes 212 and the assemblies supported thereby will be tilted about shafts 221 to maintain the air streams projected from the directors 211 at proper elevations over all parts of the orchard area surrounding the apparatus.

A walkway 232 supported by braces 233 and 234 on the carriage 197, extends along the sides of the assemblies 206 and across the outer ends thereof opposite the propellers. To avoid confusion in Fig. 17, the side rails 235 of the walkway are shown in dot-dash lines. Access to the walkway 232 is had by way of ladder 236 mounted by brackets 237 on the carriage 197 and extending upwardly between the assembly 206, as illustrated by the dotted lines in Fig. 16.

I claim:

1. Plantation protecting apparatus comprising a column, a vertically elongated carriage surrounding and rotatably mounted on said column, means located a substantial distance below the upper end of said column for laterally supporting said carriage against the vertical sides of the column, a motor supported by said carriage, and a propeller driven by the motor for forcing air outwardly above the plantings to be protected.

2. Plantation protecting apparatus comprising a column, a vertically elongated carriage surrounding said column, a step bearing on the upper end of said column rotatably supporting said carriage, a motor supported by said carriage, and a propeller driven by the motor for forcing air outwardly above the plantings to be protected.

3. Plantation protecting apparatus comprising a column, a vertically elongated carriage surrounding and rotatably mounted on said column, a plurality of rollers located a substantial distance below the upper end of said column for laterally supporting said carriage against the column, a motor supported by said carriage, and a propeller driven by the motor for forcing air outwardly above the plantings to be protected.

4. Plantation protecting apparatus comprising a tubular column of circular cross section, a carriage rotatably mounted on said column, means for supporting the rotating carriage against the circular side of said column, a motor supported by said carriage, and a propeller driven by the motor for forcing air outwardly above the plantings to be protected.

5. Plantation protecting apparatus comprising a column, a vertically elongated carriage surrounding and rotatably mounted on said column, both said column and carriage being of substantially cylindric tubular formation, a motor supported by said carriage, and a propeller driven by the motor for forcing air outwardly above the plantings to be protected.

6. Plantation protecting apparatus comprising a column, a vertically elongated carriage surrounding and rotatably mounted on said column, said column being of substantially cylindric tubular formation, means located a substantial distance below the upper end of said column for laterally supporting said carriage against the cylindric side of the column, a motor supported by said carriage, and a propeller driven by the motor for forcing air outwardly above the plantings to be protected.

7. Plantation protecting apparatus comprising a column, a vertically elongated carriage surrounding and rotatably mounted on the upper end of said column, both said column and carriage being of substantially cylindric tubular formation, a plurality of rollers located a substantial distance below the upper end of said column for laterally supporting said carriage against the column, a motor supported by said carriage, and a propeller driven by the motor for forcing air outwardly above the plantings to be protected.

8. Plantation protecting apparatus comprising a column, a vertically elongated carriage surrounding and rotatably mounted on said column and provided with lateral bearing against the sides of said column at a substantial distance below its upper end, a motor supported by said carriage, a propeller driven by the motor for forcing air outwardly above the plantings to be protected, and a ladder mounted on and rotatable with said carriage and providing access to the motor from the ground.

9. Plantation protecting apparatus comprising a column, a vertically elongated carriage surrounding and rotatably mounted on said column, both said column and carriage being of substantially cylindric tubular formation, a motor supported by said carriage, a propeller driven by the motor for forcing air outwardly above the plantings to be protected, and means for tilting said motor and propeller to vary the course with respect to the vertical, of the air stream projected by the propeller.

10. Plantation protecting apparatus comprising a column, a vertically elongated carriage surrounding and rotatably mounted on said column, both said column and carriage being of substantially cylindric tubular formation, a motor supported by said carriage, a propeller driven by the motor for forcing air outwardly above the plantings to be protected and means for tilting said motor and propeller as the carriage rotates about said column to vary the course with respect to the vertical, of the air stream projected by the propeller.

11. Plantation protecting apparatus comprising a column, a vertically elongated carriage surrounding and rotatably mounted on said column, both said column and carriage being of substantially cylindric tubular formation, a motor supported by said carriage, a propeller driven by the motor for forcing air outwardly above the plantings to be protected, and cam means for tilting said motor and propeller as the carriage rotates about said column to vary the course with respect to the vertical, of the air stream projected by the propeller.

12. Plantation protecting apparatus comprising a column, a vertically elongated carriage surrounding and rotatably mounted on said column, a motor supported by said carriage, a propeller driven by the motor for forcing air outwardly above the plantings to be protected, and means for causing said carriage to oscillate in its rotative movement.

13. Plantation protecting apparatus comprising a column, a vertically elongated carriage surrounding and rotatably mounted on said column, a motor supported by said carriage, a propeller driven by the motor and operating to rotate the carriage and force air outwardly above the plantings to be protected and means for causing said carriage to oscillate in its rotative movement.

14. Plantation protecting apparatus comprising a column, a vertically elongated carriage surrounding and rotatably mounted on said column, a motor supported by said carriage, a propeller driven by the motor for forcing air outwardly above the plantings to be protected and inertia controlled means for causing said carriage to oscillate in its rotative movement.

15. Plantation protecting apparatus comprising a column, a motor and propeller assembly, a structure supporting said assembly mounted on said column for rotation about a substantially vertical axis, a pivotal mounting in said structure whereby said assembly may be tilted about an axis transverse of the propeller axis, and means for automatically tilting said structure as said assembly rotates.

16. Plantation protecting apparatus comprising a column, a carriage, a step bearing on the upper portion of said column supporting said carriage for rotation about a vertical axis, means for laterally supporting the rotating carriage against the vertical sides of said column, a motor supported by said carriage, and a propeller driven by the motor for forcing air outwardly above the plantings to be protected.

17. Plantation protecting apparatus comprising a column, a carriage mounted on said column for rotation about a substantially vertical axis, a motor supported by said carriage, a propeller driven by the motor for forcing air outwardly above the plantings to be protected and means for tilting said motor and propeller as the carriage rotates about said column to vary the course with respect to the vertical, of the air stream projected by the propeller.

18. Plantation protecting apparatus comprising a column, a carriage mounted on said column for rotation about a substantially vertical axis, a motor supported by said carriage, a propeller driven by the motor for forcing air outwardly above the plantings to be protected, and cam means for tilting said motor and propeller as the carriage rotates about said column to vary the course with respect to the vertical, of the air stream projected by the propeller.

19. Plantation protecting means comprising a vertical supporting means, a carriage rotatably mounted on said supporting means, a motor supported by said carriage, a propeller driven by the motor and operating to rotate the carriage and force air outwardly above the plantings to be protected, a governor comprising an air reaction rotating means mounted on the carriage in a position to the side of said vertical supporting means, and means drivingly interconnecting said vertical supporting means and said air reaction rotating means whereby said rotating means is driven when said carriage rotates, said rotating means operating by virtue of air resistance to its rotative movement to limit the rotative speed of the carriage.

20. Plantation protecting apparatus comprising a vertical supporting means, a carriage rotatably mounted on said supporting means, a motor supported by said carriage, a propeller driven by the motor for forcing air outwardly above the plantings to be protected, and means for causing said carriage to oscillate in its rotative movement.

21. Plantation protecting apparatus comprising a vertical supporting means, a carriage rotatably mounted on said supporting means, a motor supported by said carriage, a propeller driven by the motor and operating to rotate the carriage and force air outwardly above the plantings to be protected and means for causing said carriage to oscillate in its rotative movement.

22. Plantation protecting apparatus comprising a vertical supporting means, a carriage rotatably mounted on said supporting means, a motor supported by said carriage, a propeller driven by the motor for forcing air outwardly above the plantings to be protected and inertia controlled means for causing said carriage to oscillate in its rotative movement.

WALTER E. SAXE.